United States Patent
Cebula et al.

(10) Patent No.: US 9,572,360 B2
(45) Date of Patent: Feb. 21, 2017

(54) METHOD FOR PRODUCING AN EDIBLE GAS HYDRATE

(75) Inventors: Deryck Jozef Cebula, Sharnbrook (GB); Julia Helen Telford, Sharnbrook (GB); Andrea Williams, Sharnbrook (GB); Shiping Zhu, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/876,060

(22) PCT Filed: Sep. 29, 2011

(86) PCT No.: PCT/EP2011/066973
§ 371 (c)(1),
(2), (4) Date: Mar. 26, 2013

(87) PCT Pub. No.: WO2012/045652
PCT Pub. Date: Apr. 12, 2012

(65) Prior Publication Data
US 2013/0183407 A1    Jul. 18, 2013

(30) Foreign Application Priority Data
Oct. 4, 2010  (EP) .................................... 10186348

(51) Int. Cl.
*A23G 9/46*    (2006.01)
*A23G 9/38*    (2006.01)
(Continued)

(52) U.S. Cl.
CPC . *A23G 9/20* (2013.01); *A23G 9/04* (2013.01); *A23G 9/325* (2013.01); *A23G 9/38* (2013.01);
(Continued)

(58) Field of Classification Search
USPC .................................................. 426/524, 660
See application file for complete search history.

(56) References Cited

U.S. PATENT DOCUMENTS

| 3,333,969 A | 8/1967 | Mitchell et al. |
| 4,347,707 A | 9/1982 | Zemelman et al. |
(Continued)

FOREIGN PATENT DOCUMENTS

| EP | 0201143 A2 | 12/1986 |
| EP | 0352829 A1 | 1/1990 |
(Continued)

OTHER PUBLICATIONS

European Search Report on Application No. EP 10 18 6348 dated Mar. 9, 2011, pp. 1-10.
(Continued)

*Primary Examiner* — Kelly Bekker
(74) *Attorney, Agent, or Firm* — Gerard J. McGowan, Jr.

(57) ABSTRACT

A method for producing an edible composite of gas hydrate and ice is provided, the method comprising the steps of contacting an aqueous solution with carbon dioxide or nitrous oxide at a sufficiently high pressure to form a gas hydrate, but at a temperature preventing this; and then reducing the temperature of the solution to form the gas hydrate and ice; characterized in that the aqueous solution contains from 0.0001 to 2 wt % of an ice structuring protein. Frozen confections containing gas hydrates and methods for producing them are also provided.

11 Claims, 1 Drawing Sheet

(51) Int. Cl.
  *A23G 9/20* (2006.01)
  *A23G 9/04* (2006.01)
  *A23G 9/32* (2006.01)
  *A23G 9/48* (2006.01)
  *A23G 9/52* (2006.01)

(52) U.S. Cl.
  CPC . *A23G 9/46* (2013.01); *A23G 9/48* (2013.01); *A23G 9/52* (2013.01)

(56) References Cited

U.S. PATENT DOCUMENTS

| | | | |
|---|---|---|---|
| 4,393,660 | A | 7/1983 | Kleiner et al. |
| 4,398,394 | A | 8/1983 | Kleiner et al. |
| 4,404,807 | A | 9/1983 | Zemelman et al. |
| 5,538,745 | A | 7/1996 | Tapfer et al. |
| 2002/0001657 | A1 | 1/2002 | Brake et al. |
| 2003/0134024 | A1 | 7/2003 | Malone |
| 2006/0024419 | A1* | 2/2006 | Aldred et al. ............ 426/565 |
| 2007/0141206 | A1* | 6/2007 | Bramley et al. ........... 426/100 |

FOREIGN PATENT DOCUMENTS

| | | |
|---|---|---|
| EP | 1800543 A1 | 6/2007 |
| EP | 1886579 A1 | 2/2008 |
| JP | 2007238849 | 9/2007 |
| WO | WO9402414 A1 | 2/1994 |
| WO | WO9523521 A1 | 9/1995 |
| WO | WO9716980 A1 | 5/1997 |
| WO | WO9804148 A2 | 2/1998 |
| WO | WO9804699 A1 | 2/1998 |
| WO | WO9937673 A2 | 7/1999 |
| WO | WO 00/53027 * | 9/2000 ............ A23G 9/02 |
| WO | WO0053029 A1 | 9/2000 |
| WO | WO0058342 | 10/2000 |
| WO | WO0183534 A1 | 11/2001 |
| WO | WO0234065 A1 | 5/2002 |
| WO | WO2008009616 A2 | 1/2008 |
| WO | WO2010069769 A1 | 6/2010 |

OTHER PUBLICATIONS

PCT International Search Report and Written Opinion on International Application No. PCT/EP2010/066973 dated Apr. 12, 2014, pp. 1-11.
Clarke et al. Cryoletters:, vol. 23, 2002, pp. 89-92, Ice Structuring proteins, a new name for antifreeze proteins.
Davies, vol. 4, 1990, pp. 2460-2468, Biochemistry of fish antifreeze proteins.
Sidebottom et al., "Nature", vol. 406, 2000, p. 256.
Linder et al., The Hydrophobins HFBI and HFBII from *Trichoderma reesei* Showing Efficient Interactions with Nonionic Surfactants in Aqueous Two-Phase Systems, Biomacromolecules, 2001, pp. 511-517, vol. 2.
IPRP2 in PCTEP2011066973, Sep. 12, 2012, WO, pp. 1-6.
English language translation of Eurasian Patent Office Notification dated Feb. 2, 2015 in Application No. 201390501/13 (same patent family as present application U.S. Appl. No. 13/876,060) page 1.
Sushchik, Valentina G., Development of a method for producing proteins that structure the ice for the ice cream, Thesis Abstract, 2009, pp. 1-8.

* cited by examiner

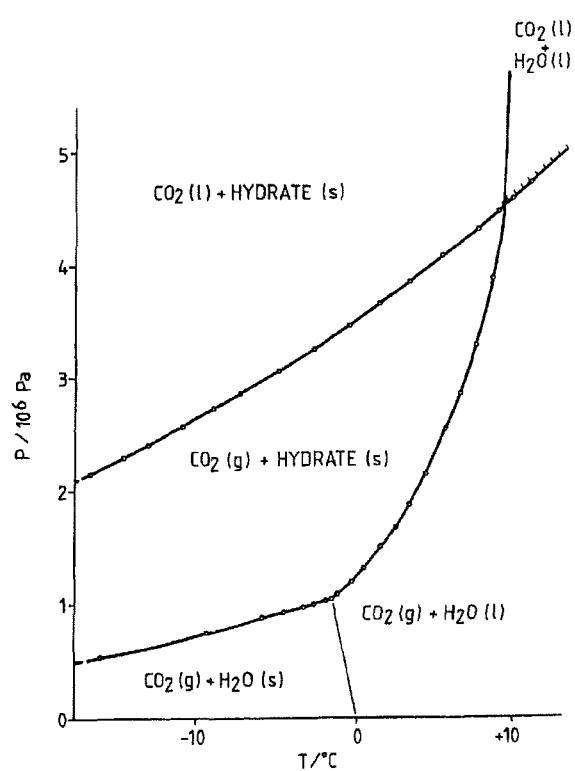

METHOD FOR PRODUCING AN EDIBLE GAS HYDRATE

TECHNICAL FIELD OF THE INVENTION

The present invention relates to edible composites of gas hydrate and ice, and frozen confections comprising such composites.

BACKGROUND TO THE INVENTION

Frozen confections which contain a hydrate of a gas such as carbon dioxide ($CO_2$) or nitrous oxide ($N_2O$) give a pleasant sparkling or fizzy sensation when consumed. Such products are disclosed for example in WO 94/02414, WO 97/16980 and U.S. Pat. No. 4,398,394. Gas hydrates (also known as clathrates) are usually produced by contacting the gas with water under high pressure and then reducing the temperature. Generally, an excess of water is used so that a composite consisting of gas hydrate crystals in ice is formed. The composite is then typically ground into particles and mixed with the other ingredients of the frozen confection (e.g. a syrup or mix containing sugar, flavour, protein, fat etc.). The gas hydrate is formed using essentially pure water, since the presence of other ingredients (such as sugar, colour, flavour etc.) decreases the controllability of the process and/or reduces the stability of the product.

WO 02/34065 discloses a method for preparing a carbonated beverage wherein carbon dioxide hydrate particles are mixed with a syrup component. It is stated that syrups which contain sugar should not be added before completion of the $CO_2$-hydrate reaction because this makes the reaction less stable as the syrups tend to foam. When an artificially sweetened syrup is used, it can be added before the hydrate is formed. When such a syrup is used pectin and guar gum can be added into the product during mixing to prevent separation. There is no suggestion that any other substances could be added before the hydrate is formed.

U.S. Pat. No. 5,538,745 discloses a process for producing frozen confections by mixing particles of sugar encapsulated in fat into a frozen aerated solution of milk protein. It is stated that clathrate ice crystals can be formed by adding $CO_2$, $N_2$, $N_2O$ or mixtures thereof to the protein solution. These gases can comprise up to 100% of the gases used to aerate the solution. The milk protein is present in amounts typical for ice cream, i.e. >5 wt %.

The "activity" of the gas hydrate, i.e. the amount of entrapped gas per unit weight of ice, depends on temperature and pressure conditions in which the gas hydrate is produced as well as the relative amounts of gas and water that are contacted with each other.

It is desirable to be able to produce gas hydrates with increased activity and our co-pending application WO 2010/069770 discloses that composites of gas hydrate and ice having increased activity can be produced provided that an aerating agent is present during the formation of the gas hydrate. Although WO 2010/069770 provides gas hydrates with increased activity, alternative approaches are also highly desirable.

BRIEF DESCRIPTION OF THE INVENTION

We have now found that composites of gas hydrate and ice having increased activity can be produced provided that an ice structuring protein (ISP) is present during the formation of the gas hydrate.

Accordingly, in a first aspect, the present invention provides an edible composite of gas hydrate and ice comprising from 0.0001 to 2 wt % of an ice structuring protein.

Preferably the edible composite consists essentially of ice, the gas hydrate and the ice structuring protein.

In a second aspect, the present invention provides a method for producing an edible composite of gas hydrate and ice, the method comprising the steps of:
a) contacting an aqueous solution with carbon dioxide or nitrous oxide at a sufficiently high pressure to form a gas hydrate, but at a temperature preventing this; and then
b) reducing the temperature of the solution to form the gas hydrate and ice;
characterized in that the aqueous solution contains from 0.0001 to 2 wt % of an ice structuring protein.

Preferably the gas is carbon dioxide.

Preferably the ice structuring protein is a type III ice structuring protein.

Preferably the ice structuring protein is present in the aqueous solution in an amount of from 0.001 to 2 wt %, more preferably from 0.01 to 1 wt %.

Preferably the aqueous solution consists essentially of water, the gas and the ice structuring protein.

In one embodiment, step a) is performed in a pressure vessel which is then placed in a freezer in step b).

In another embodiment, in step b) the aqueous solution is passed under pressure through an extruder with a refrigerated barrel.

Preferably the method of the invention is followed by combining the composite with remaining ingredients to form a frozen confection.

Preferably the composite constitutes from 5 to 50 wt %, preferably 10 to 20 wt % of the frozen confection.

In a third aspect, the present invention provides a frozen confection comprising an edible composite of the first aspect of the invention.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6$^{th}$ Edition, Robert T. Marshall, H. Douglas Goff and Richard W. Hartel (2003), Kluwer Academic/Plenum Publishers. All percentages, unless otherwise stated, refer to the percentage by weight based on the frozen confection.

BRIEF DESCRIPTION OF THE DRAWINGS

The present invention will be further described with reference to FIG. 1 which shows the phase diagram for carbon dioxide hydrates.

GAS HYDRATES AND THEIR PRODUCTION

A gas hydrate is a crystalline solid which consists of a gas molecule surrounded by a cage of water molecules. Thus it is similar to ice, except that the crystalline structure has a guest gas molecule within the cage of water molecules. Many gases have molecular sizes suitable to form hydrates, including carbon dioxide and nitrous oxide. Gas hydrates have a particular stoichiometric formula: for carbon dioxide gas hydrate it is $CO_2 0.5.75 H_2O$. However, gas hydrate crystals are unstable at atmospheric pressure (even at typical cold store temperatures). Therefore, when gas hydrates are prepared for use in frozen confections, an excess of water (i.e. more water than prescribed by the stoichiometric ratio) is typically used so that a composite of gas hydrate crystals in ice is formed. In effect, the ice acts as a microscopic pressure vessel which prevents the gas hydrate from decomposing during manufacture and storage. On warming (e.g. in the mouth when consumed), the ice layer around the gas hydrate crystals melts, and the gas hydrate decomposes releasing the gas. This provides a "fizzing" sensation similar to that of carbonated drinks.

Suitable temperature and pressure conditions for the formation of carbon dioxide or nitrous oxide gas hydrates can be derived from the phase diagrams of the respective gas-aqueous liquid combination, which are available in the literature. For example, the phase diagram for carbon dioxide gas hydrates is given in FIG. 1. In step a), the aqueous solution of the ice structuring protein and carbon dioxide is pressurized to a pressure of about 10 bar ($10^6$ Pa) or higher, preferably from 15 to 45 bar. The temperature is above 0° C., preferably such as about 5° C. In step b), the temperature is reduced to below 0° C. (e.g. −10 or −20° C.), thus forming the solid gas hydrate/ice composite.

The gas hydrates can be prepared as follows. First, the ice structuring protein is dissolved in water. The solution is then pressurized (using carbon dioxide or nitrous oxide or mixtures thereof). The solution may be cooled to aid dissolution of the gas. Preferably the aqueous solution consists essentially of water and the ice structuring protein, together with the gas, so that no other substances are present in significant amounts (e.g. the aqueous solution contains less than 1 wt %, preferably less than 0.1 wt % of other substances). At this stage, the temperature of the solution is preferably as low as possible without entering the part of the phase diagram where gas hydrate is formed. After allowing sufficient time for gas to dissolve the aqueous solution is frozen, resulting in gas hydrate particles encapsulated in ice.

This process can be carried out as a batch process, for example the aqueous gasified solution is put into a pressure vessel which is then placed in a freezer for the freezing step. Alternatively, the process may be a continuous process. For example the aqueous gasified solution (preferably at a temperature of from 0° C. to 15° C.) can be passed under pressure (e.g. 10 bars or higher) through an extruder (e.g. a screw extruder) with a cooled barrel. Preferably the temperature of barrel near the exit end is from −50° C. to −10° C. The pressure is maintained by the formation of a frozen plug of product within the extruder, preferably at or near the extruder exit. Thus the extruder allows the temperature and pressure conditions required for the formation of gas hydrate to be created.

Ice Structuring Protein

Ice structuring proteins (ISPs) are proteins that can influence the shape and size of the crystals of ice formed during freezing, and inhibit recrystallisation of ice (Clarke et al., 2002, Cryoletters 23: 89-92; Marshall et al., Ice Cream, 6$^{th}$ Edition, ibid.). Many of these proteins were identified originally in organisms that live in sub-zero environments and are thought to protect the organism from the deleterious effects of the formation of ice crystals in the cells of the organism. For this reason many ice structuring proteins are also known as antifreeze proteins (AFPs). In the context of the present invention, an ISP is defined as a protein that has ice recrystallisation inhibitory (RI) activity.

Ice recrystallisation inhibitory activity properties can conveniently be measured by means of a modified splat assay as described in WO00/53029:

2.5 µl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20× objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transfered to a Quantimet 520 MC image analysis system (Leica, Cambridge UK) by means of a Sony monochrome CCD video-camera.

Ice crystal sizing can be performed by hand-drawing around the ice-crystals. Typically, at least 100 to 400 crystals are sized for each sample. The ice crystal size is taken as being the longest dimension of the 2D projection of each crystal. The average crystal size is determined as the number average of the individual crystal sizes. The size of the ice-crystals in both assays is compared. If the size at 30-60 minutes is similar or only moderately (less than 10%) increased compared to the size at t=0, and/or the crystal size is less than 20 micrometer, preferably from 5 to 15 micrometer this is an indication of good ice-crystal recrystallisation properties.

Significant ice recrystallisation inhibitory activity can be defined as where a 0.01 wt % solution of the ISP in 30 wt % sucrose, cooled rapidly (at least Δ50° C. per minute) to −40° C., heated rapidly (at least Δ50° C. per minute) to −6° C. and then held at this temperature results in an increase in average ice crystal size over one hour of less than 5 µm.

ISPs for use according to the present invention can be derived from any source provided they are suitable for inclusion in food products. ISPs have been identified to date in fish, plants, lichen, fungi, micro-organisms and insects. In addition, a number of synthetic ISPs have been described.

Examples of fish ISP materials are AFGP (for example obtainable from Atlantic cod, Greenland cod and Tomcod), Type I ISP (for example obtainable from Winter flounder, Yellowtail flounder, Shorthorn sculpin and Grubby sculpin), Type II ISP (for example obtainable from Sea raven, Smelt and Atlantic herring) and Type III ISP (for example obtainable from Ocean pout, Atlantic wolffish, Radiated shanny, Rock gunnel and Laval's eelpout).

Type III ISPs are particularly preferred. Type III ISPs typically have a molecular weight of from about 6.5 to about 14 kDa, a beta sandwich secondary structure and a globular tertiary structure. A number of genes encoding type III ISPs have been cloned (Davies and Hew, 1990, FASEB J. 4: 2460-2468). A particularly preferred type III ISP is type III HPLC-12 (Accession No. P19614 in the Swiss-Prot protein database).

Lichen AFPs are described in WO99/37673 and WO01/83534.

Examples of plants in which ISPs have been obtained are described in WO98/04699 and WO98/4148 and include garlic-mustard, blue wood aster, spring oat, winter cress, winter canola, Brussels sprout, carrot (GenBank Accession No. CAB69453), Dutchman's breeches, spurge, daylily, winter barley, Virginia waterleaf, narrow-leaved plantain, plantain, speargrass, Kentucky bluegrass, Eastern cottonwood, white oak, winter rye (Sidebottom et al., 2000, Nature 406: 256), bittersweet nightshade, potato, chickweed, dandelion, spring and winter wheat, triticale, periwinkle, violet and grass.

The ISPs can be obtained by extraction from native sources by any suitable process, for example the isolation processes as described in WO98/04699 and WO98/4148.

Alternatively, ISPs can be obtained by the use of recombinant technology. For example host cells, typically microorganisms or plant cells, may be modified to express ISPs and the ISPs may then be isolated and used in accordance with the present invention. Techniques for introducing nucleic acid constructs encoding ISPs into host cells are well known in the art.

Typically, an appropriate host cell or organism would be transformed by a nucleic acid construct that encodes the desired ISP. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species include yeasts such as (but not limited to) those of the genera *Saccharomyces, Kluyveromyces, Pichia, Hansenula, Candida, Schizo saccharomyces* and the like, and filamentous fungal species such as (but not limited to) those of the genera *Aspergillus, Trichoderma, Mucor, Neurospora, Fusarium* and the like. Preferably the species selected is a yeast, most preferably a species of *Saccharomyces* such as *S. cerevisiae*. Where glycosylation of the ISP leads to reduced activity then it is preferred that the host exhibits reduced glycosylation of heterologous proteins. A wide variety of plants and plant cell systems can also be transformed with the nucleic acid constructs of the desired polypeptides. Examples of plant species include maize, tomato, tobacco, carrots, strawberries, rape seed and sugar beet.

The sequences encoding the ISPs are preferably at least 80% identical at the amino acid level to an ISP identified in nature, more preferably at least 95% or 100% identical. However, persons skilled in the art may make conservative substitutions or other amino acid changes that do not reduce the RI activity of the ISP. For the purpose of the invention these ISPs possessing this high level of identity to an ISP that naturally occurs are also embraced within the term "ISPs".

The amount of ice structuring protein in the aqueous solution is at least 0.0001 wt %, preferably at least 0.001, more preferably at least 0.01 wt %, most preferably at least 0.1 wt %. The amount of ice structuring protein is less than 2 wt %, preferably less than 1 wt %, more preferably less than 0.5 wt %, most preferably less than 0.25 wt %.

We have found that the gas hydrate/ice composite thus produced has higher activity (quantity of entrapped gas per unit weight ice) than when made without ice structuring protein. Preferably the activity is at least 5%, more preferably at least 10%, most preferably at least 15% greater than when the ice structuring protein is not used (with the same process conditions).

The gas hydrate/ice composite is generally intended as an additive to frozen confections to make them fizzy in the mouth. Thus after production, the composite is typically broken up into particles of the required size (e.g. ~1-5 mm), for example by milling. The pieces may then be packaged directly, or they may be mixed with a sauce or incorporated into a frozen confection such as ice cream, sorbet or water ice to form a final product.

The term "frozen confection" means a sweet-tasting fabricated foodstuff intended for consumption in the frozen state (i.e. under conditions wherein the temperature of the foodstuff is less than 0° C., and preferably under conditions wherein the foodstuff comprises significant amounts of ice). Frozen confections include ice cream, sorbet, sherbet, frozen yoghurt, water ice, milk ice and the like. Frozen confections such as ice cream and frozen yoghurt typically contain fat, protein (such as milk protein) sugars, together with other minor ingredients such as stabilisers, emulsifiers, colours and flavourings. Water ice typically contains, by weight of the composition 15-25% sugars together with stabilisers, colours and flavourings.

Typically the other ingredients have already been combined to produce a frozen confection (e.g. ice cream) or a sauce/syrup, into which the gas hydrate/ice particles are mixed. Preferably the edible gas hydrate/ice composite constitutes from 5 to 50 wt %, preferably 10 to 20 wt % of the total frozen confection After combining the gas hydrate with the other ingredients, the frozen confection may be subjected to a further freezing step (e.g. hardening), and may then be packaged.

The invention will now be further described by reference to the examples, which are illustrative only and non-limiting.

Example 1

Carbon dioxide hydrate was made using the following process. A pressure vessel (0.5 L internal volume) was placed in a water bath at 5° C. 300 g of an aqueous solution of ice structuring protein (ISP) was placed inside the pressure vessel, together with a magnetic stirrer. The vessel was pressurized to 20 bar with carbon dioxide, and held at 5° C. with stirring for 6 hours. At the end of this time, the carbon dioxide feed was disconnected (without releasing the pressure), the vessel was sealed and then placed in freezer at −20° C. overnight to form a piece of ice containing carbon dioxide hydrate crystals. The ice was then removed from the pressure vessel and broken up into pieces. Samples of approximately 10 g were then taken for activity measurements.

The ISP used was Type III ISP HPLC12 (ex Martek Biosciences Kingstree Corporation). Control samples using no ISP were also produced.

The activity of the samples was measured as follows. Approximately 10 g of the ice/gas hydrate composite was sealed into an aerosol can. The can and contents were equilibrated to room temperature, so that the ice melted and hydrate decomposed, releasing the gas. The headspace gas pressure was then measured using a Druck DPI 705 pressure meter. The activity is calculated as the volume of carbon dioxide (ml) released per gram of composite sample using the following calculation.

The sealed can (total volume V) contains a known mass (M) and volume $V_s$ of the composite, which contains an amount of carbon dioxide which is to be determined (i.e. the activity, A). The can also contains a volume $(V-V_s)$ of air which is initially at temperature $T_o$ (taken to be 273K) and atmospheric pressure, $P_o$ (1.0×10$^5$ Pa). The system then warms up to ambient temperature T (taken to be 293K), and the ice melts, releasing the carbon dioxide. At final equilibrium, the can contains a volume $V_1$ of liquid, in which part of the air and carbon dioxide are dissolved. The remaining gaseous mixture of air and carbon dioxide has a volume $(V-V_1)$ and a pressure, P which is measured. Air and carbon dioxide are assumed to behave as ideal gases. By applying the ideal gas law and conservation of mass and by knowing the densities of ice (920 kgm$^{-3}$) and water (1000 kgm$^{-3}$), the activity (A) can be calculated as:

$$A = \frac{RT_0}{MP_0} \cdot \frac{Z+H_c}{H_c} \cdot \left[ \frac{P(V-V_l)}{RT} - \left( \frac{H_a P_0 (V-V_s)}{RT_0 (Z+H_a)} \right) \right]$$

where $$Z = \frac{mRT}{m_w(V-V_l)}$$

$H_a$ is the solubility of air (6.73×10$^9$ Nm$^{-2}$) and is the solubility of carbon dioxide (1.42×10$^8$Nm$^{-2}$). R is the ideal gas constant (8.31 JK$^{-1}$ mol$^{-1}$) and $m_w$ is the molecular weight of water (18 gmol$^{-1}$). Three clathrate production runs were carried out for each solution. Six samples were measured for each clathrate production run, and the mean activities (expressed as ml CO$_2$/g product) are given in Table 1.

TABLE 1

| Additive | Amount (wt %) | Activity (ml/g) | Increase % |
|---|---|---|---|
| None | — | 17.45 | — |
| ISP III | 0.005 | 19.55 | 10.74 |
| ISP III | 0.05 | 21.10 | 17.30 |

The example shows that ice structuring proteins increase the activity of the resulting gas hydrate/ice composites.

The various features and embodiments of the present invention, referred to in individual sections above apply, as appropriate, to other sections, mutatis mutandis. Consequently features specified in one section may be combined with features specified in other sections, as appropriate.

The invention claimed is:

1. A method for producing an edible composite of gas hydrate and ice, the method comprising the steps of:
    a) contacting an aqueous solution with carbon dioxide or nitrous oxide at a sufficiently high pressure to form a gas hydrate, but at a temperature preventing this; and then
    b) reducing the temperature of the solution to form the gas hydrate and ice; characterized in that the aqueous solution contains from 0.0001 to 2 wt % of an ice structuring protein having ice recrystallization inhibitory activity (RI) as measured by means of a modified splat test.

2. A method according to claim 1 wherein the gas is carbon dioxide.

3. A method according to claim 1 wherein the ice structuring protein is a type III ice structuring protein.

4. A method according to claim 1 wherein the ice structuring protein is present in an amount of from 0.001 to 1 wt %.

5. A method according to claim 4 wherein the ice structuring protein is present in an amount of 0.01 to 0.5 wt %.

6. A method according to claim 1 wherein the aqueous solution consists essentially of water, the gas and the ice structuring protein.

7. A method according to claim 1 wherein step a) is performed in a pressure vessel which is then placed in a freezer in step b).

8. A method according to claim 1 wherein in step b) the aqueous solution is passed under pressure through an extruder with a refrigerated barrel.

9. A method of forming a frozen confection comprising the steps of: forming an edible composite according to the method of claim 1; and then combining the edible composite with additional ingredients to produce the frozen confection.

10. A method according to claim 9 wherein the composite constitutes from 5 to 50 wt % of the frozen confection.

11. The method according to claim 1 wherein the edible composite consists essentially of the ice and the gas hydrate formed from the aqueous solution comprising the ice structuring protein.

* * * * *